US008516221B2

(12) United States Patent
Thelen

(10) Patent No.: US 8,516,221 B2
(45) Date of Patent: Aug. 20, 2013

(54) ON-THE FLY TLB COALESCING

(75) Inventor: Greg Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 12/263,233

(22) Filed: Oct. 31, 2008

(65) Prior Publication Data
US 2010/0115229 A1    May 6, 2010

(51) Int. Cl.
*G06F 12/00*    (2006.01)
(52) U.S. Cl.
USPC .......................................................... 711/207
(58) Field of Classification Search
None
See application file for complete search history.

(56) References Cited

U.S. PATENT DOCUMENTS

| 5,809,563 | A | 9/1998 | Yamada et al. |
| 6,216,214 | B1 | 4/2001 | Bryg et al. |
| 7,409,524 | B2 | 8/2008 | Safford et al. |
| 2005/0184994 | A1* | 8/2005 | Suzuoki et al. ............... 345/502 |
| 2006/0179236 | A1* | 8/2006 | Shafi .............................. 711/137 |
| 2007/0055844 | A1 | 3/2007 | Dong et al. |
| 2007/0067604 | A1* | 3/2007 | Elnozahy et al. ............. 711/207 |
| 2009/0070545 | A1* | 3/2009 | Stecher .......................... 711/205 |

OTHER PUBLICATIONS

Tanenbaum, Structured Computer Organization, 1984, Prentice Hall, pp. 10-12.*
Wienand, "Transparent Large-Page Support for Itanium Linux", © Jul. 14, 2008.*
Buros, "Levereage transparent huge pages on Linus on POWER", © Apr. 20, 2007.*
Intel Itanium Architecture Softwhare Developer's Manual, vol. 2: System Architecture, Oct. 2002, p. 1-27.
Heiser, Gernot: "Dealing with TLB Tags or I Want to Build a System, What Can L4 Do for Me"; School of Computer Science and Engineering~University of NSW, Sydney 2052, Australia; Oct. 11, 2001 p. 1-8.

* cited by examiner

*Primary Examiner* — Brian Peugh

(57) ABSTRACT

An apparatus and method for coalescing TLB entries on-the-fly at virtual address translation time is disclosed. A search is made for a requested virtual address translation in the VHPT. Further searching is performed for additional VHPT entries meeting certain coalescing and compatibility criteria. The compatible VHPT entries are coalesced and stored in the TLB into a single combined TLB entry.

8 Claims, 6 Drawing Sheets

ND-THE FLY TLB COALESCING

BACKGROUND

Most computing systems employ virtual memory techniques in order to create a larger memory space than the actual physical memory. The virtual address space is partitioned into contiguous blocks of virtual memory called pages. Each page is referenced by a virtual address which has a corresponding physical address. A page table is used to store the correspondence between a virtual address and its related physical page.

Due to its size, the page table is often stored in main memory. In some systems, portions of the page table can be stored in a specialized cache memory termed a translation lookaside buffer (TLB). When a processor requests a particular virtual address, the TLB is searched first for the corresponding physical address instead of accessing the page table in main memory. If the entry is in the TLB (otherwise termed a TLB hit), the physical address is retrieved and used to access memory. If the TLB does not contain the desired virtual address, a TLB miss occurs, and the desired translation is obtained from the page table, or the operating system's fault handler, and inserted into the TLB. A TLB miss, however, takes a significantly longer time thereby degrading the processor's performance.

BRIEF DESCRIPTION OF THE DRAWINGS

The features and advantages of the disclosure will be more clearly understood hereinafter as a result of a detailed description of the preferred embodiments when taken in conjunction with the following drawings.

DETAILED DESCRIPTION

The following description is provided to enable any person skilled in the art to which the invention pertains to make and use the technology described herein and sets forth the preferred embodiments. Various modifications, however, will remain readily apparent to those skilled in the art. Any and all such modifications, equivalents and alternatives are intended to fall within the spirit and scope of the presently claimed invention.

The technology described herein, in at least some embodiments, pertains to a system and method for coalescing multiple page references into a single TLB entry at the time of virtual address translation (otherwise referred herein as on-the-fly). In some instances, it is possible to combine one or more pages having adjacent or contiguous physical addresses into a single TLB entry at the time a missing virtual address translation is being provided to the TLB. In order to increase the likelihood of a TLB hit, it would be advantageous for the TLB to contain more virtual page translations without consuming additional TLB entries.

This technology will be described with respect to a microprocessor system utilizing the Itanium architecture. However, the principles taught herein are not limited to this particular microprocessor architecture and can be applied, without limitation, to the X86, PA-RISC, ARM, and other microprocessor and processor architectures.

Figure 1:
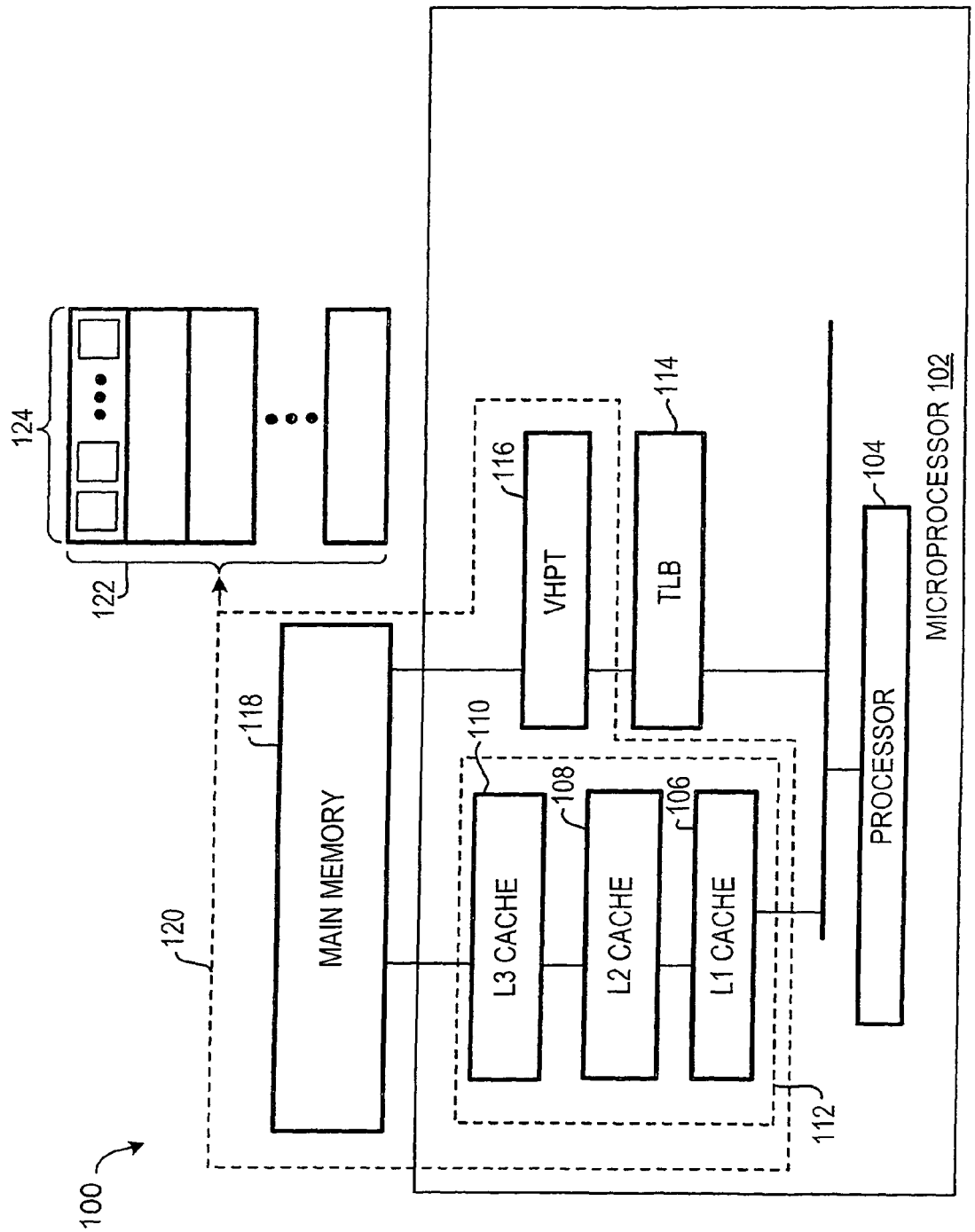
FIG. 1 illustrates an exemplary microprocessor system in accordance with an embodiment of the invention.

As shown in FIG. 1, there is an exemplary microprocessor-based system 100 in a simplified and schematic form. The system 100 includes a microprocessor 102 having a processor 104 connected to an internal memory. The internal memory is structured using a tri-level cache memory having a level one cache 106, a level two cache 108, and a level three cache 110, collectively referred to as cache hierarchy 112. The system 100 can be any microprocessor-based system including, without limitation, computer systems, servers, personal computers, portable electronic devices utilizing microprocessors, PDAs, calculators, and any electronic device having a microprocessor and memory.

The cache hierarchy 112 is used to store data and instructions used by processor 104. The processor 104 is directly connected to the first level cache 106, the first level cache 106 is directly connected to the second level cache 108, the second level cache 108 is directly connected to the third level cache 110, and the third level cache 110 is directly connected to the main memory 118. When the processor 104 searches for information, such as data or instructions, it searches the first level cache 106 first and when not found, the processor 104 searches the cache hierarchy 112 in successive order and if not found, continues to the main memory 118.

The main memory 118 is located external to the microprocessor 102 and can take the form of any known memory devices, such as, without limitation, floppy drives, hard disk drives, optical drives, tape devices, memory card devices, or random access memory devices, and the like.

The processor 104 is also directly connected to a TLB 114. The TLB 114 is preferably a cache memory containing physical page addresses as well as other page-related information. The TLB 114 is connected to a page table or virtual hash page table (VHPT) 116. The VHPT 116 is also a cache memory that has a large number of entries, known as page table entries (PTE), whereby each PTE contains page related information. The TLB 114 is a modified version of the VHPT 116 containing a smaller set of the information stored in the VHPT 116.

The combination of the main memory, the VHPT 116, and the cache hierarchy 112 form what is referred to as the virtual memory 120.

The virtual memory 120 is partitioned into a number of virtual regions 122, each of which has an associated number of virtual pages 124. In a preferred embodiment, there are eight virtual regions 122, each of which identifies a separate address space. Separate address spaces are useful for multiple concurrent processes. A virtual region 122 can be set up to support virtual pages having a uniform page size or alternatively, variable page sizes, ranging from 4 K (kilobyte) to 4 G (gigabyte) pages. Preferably, the supported page sizes are 4 k, 8 k, 16 k, 256 K, 1 M (megabyte), 4 M, 16 M, 64 M, 256 M, 1 G, and 4 G.

Figure 2:
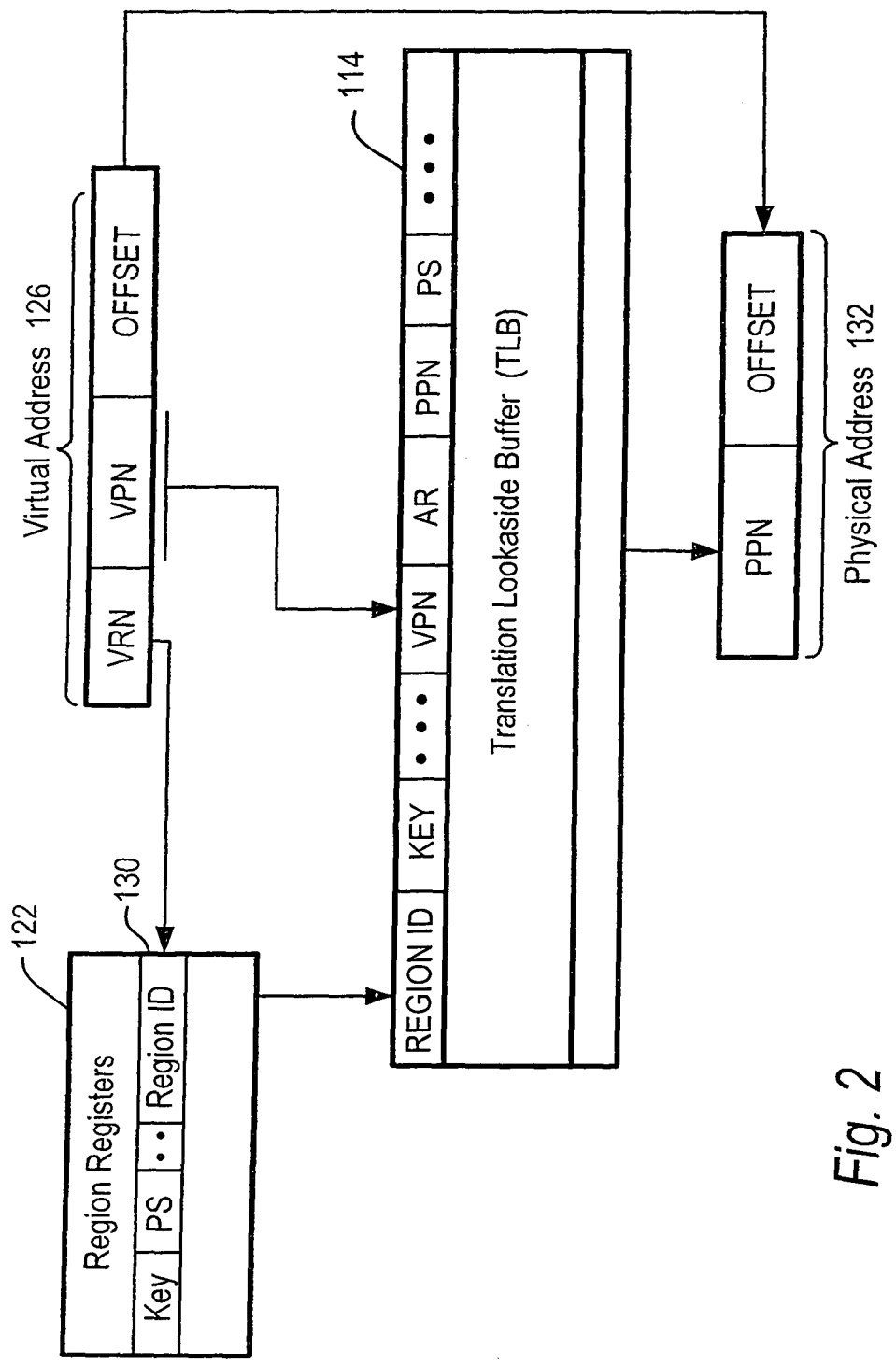
FIG. 2 illustrates an exemplary virtual address mapping system in accordance with an embodiment of the invention.

In order for the processes running on the processor to make use of the virtual memory, there is a virtual memory translation that maps the virtual address into the physical address within the memory devices 112, 118. FIG. 2 illustrates an embodiment of virtual address translation when there is a corresponding entry for the virtual address in the TLB 114.

As shown in FIG. 2, each virtual page has a corresponding 64-bit virtual address 126. The virtual address 126 is composed of a 3-bit virtual region number (VRN) that is used to identify an associated virtual region. The least significant bits form the offset (OFFSET) and the remaining bits form the virtual page number (VPN). The exact bit positions for the offset and the VPN vary since they are dependent on the page size for the related virtual page.

A TLB entry includes a number of fields, such as without limitation, the following: (1) REGION ID—which identifies the virtual page's related region; (2) KEY—which is a protection key used to tag the translation to a protected domain; (3) VPN—virtual page number; (4) AR—access rights—which is used to execute permission and privilege controls; (5) PPN—physical page number—provides the most significant bits of the mapped physical address depending on the page size used in the mappings; and (6) PS—page size.

The TLB 114 is a content-addressable memory and can be searched using a key consisting of the requested REGION ID and VPN. The TLB 114 is searched for a match corresponding to the key. If the requested entry is found in the TLB 114, the corresponding physical page number (PPN) is identified and sent to physical address 132. The OFFSET of the virtual address 126 is then combined with the PPN to form the physical address 132 which is then used to access the physical page in memory.

Figure 3:
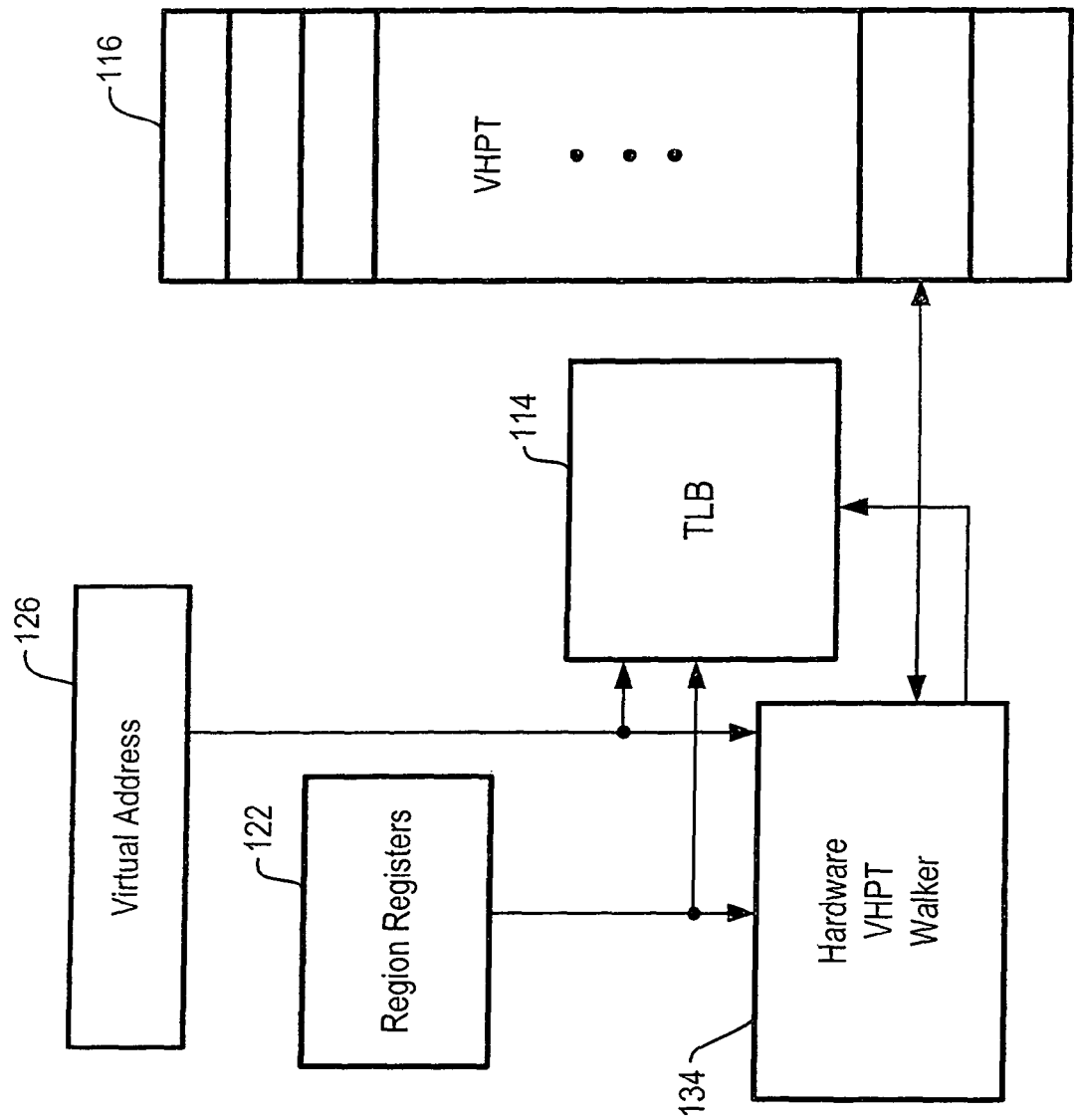
FIG. 3 illustrates another exemplary virtual address mapping system in accordance with an embodiment of the invention.
Figure 4:
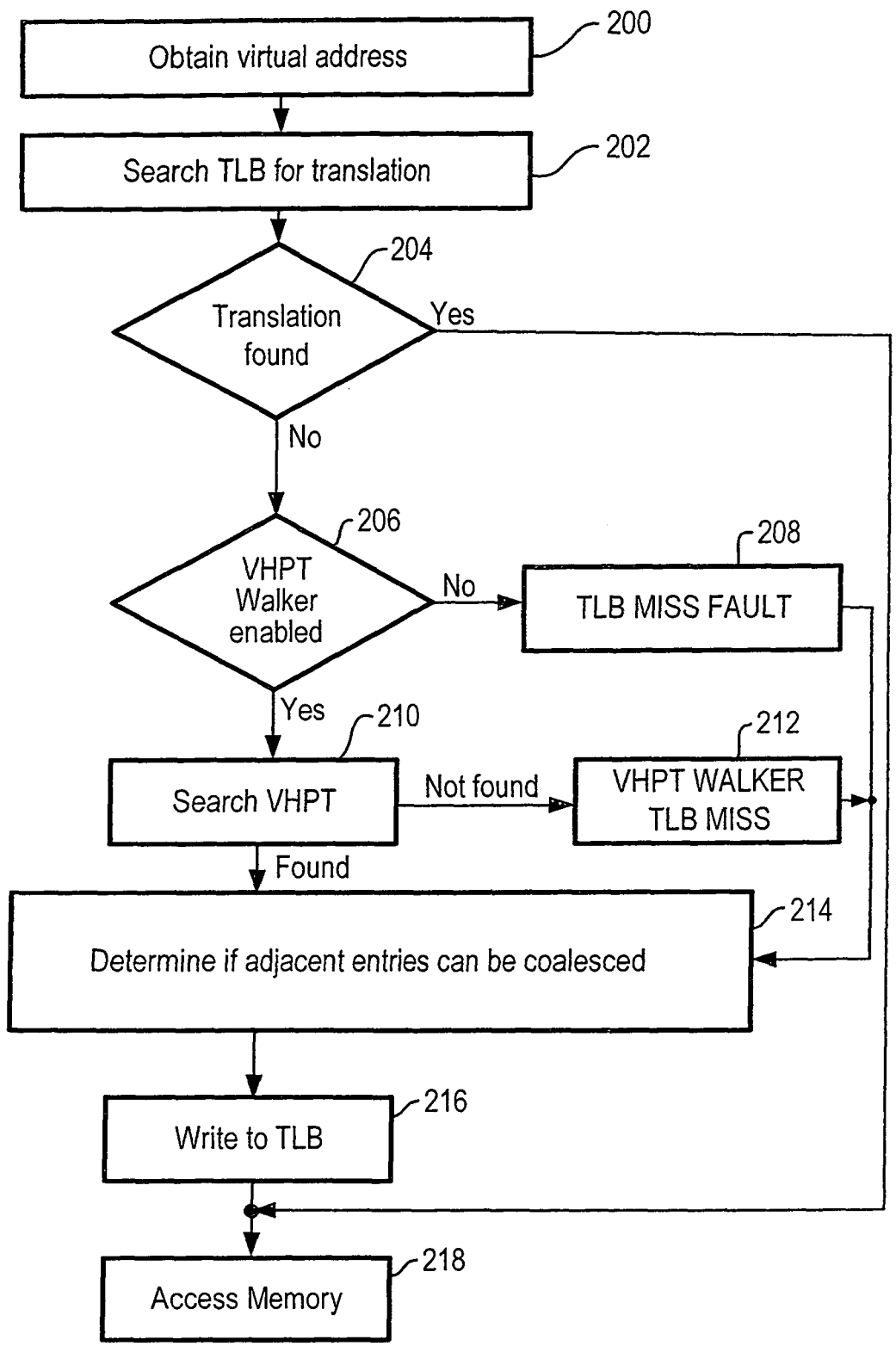
FIG. 4 is a flowchart illustrating the steps performed in accordance with an embodiment of the invention.
Figure 6:
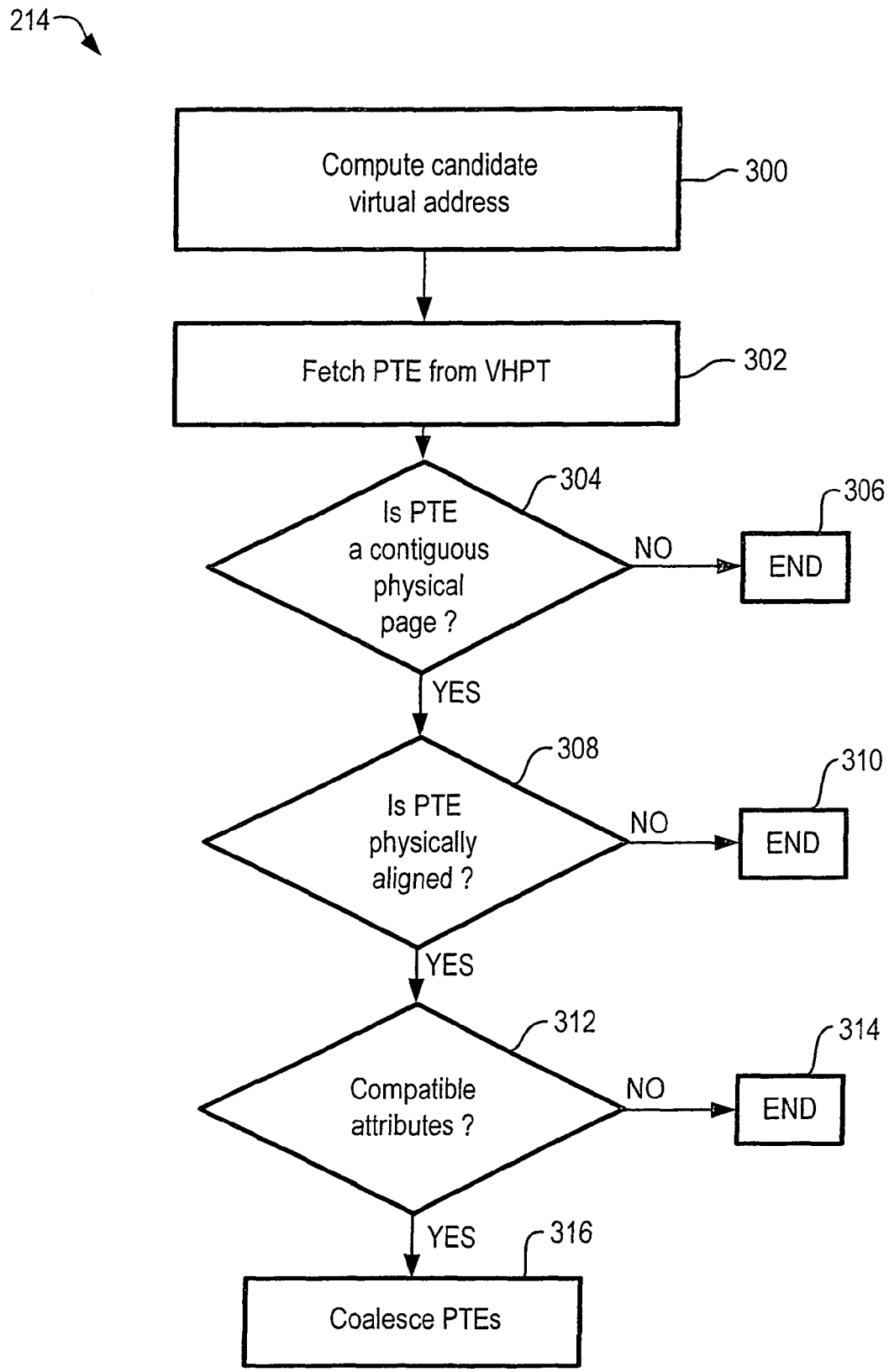
FIG. 6 is a flowchart illustrating the steps performed in determining coalescing in accordance with an embodiment of the invention.

FIGS. 3, 4 and 6 illustrate an embodiment of virtual address translation when the requested translation is not in the TLB 114. Referring to FIGS. 3 and 4, initially, a request is made to translate virtual address 126 (step 200). The TLB 114 is searched as described above with respect to FIG. 4 (step 202). If the translation is found in the TLB 114 (step 204—yes), the physical address is formed as noted above and the corresponding memory device accessed (step 218).

When the requested translation is not in the TLB 114, the VHPT 116 is searched. The VHPT 116 can be searched through a hardware mechanism commonly referred to as the hardware VHPT walker 134. The hardware VHPT walker 134 is an optional feature that improves the performance of the virtual translation. However, if the VHPT walker 134 is not enabled, the operating system, through fault handlers and the like (e.g., software programs), perform the translation.

If the hardware VHPT walker 134 is enabled (step 206—yes), the hardware VHPT walker 134 is used to search the VHPT 116 (step 210). The VHPT 116 is accessed through a hash function that uses the VPN. If the hardware VHPT walker 134 is not enabled (step 206-N), a TLB miss fault is raised (step 208).

In this case, the operating system takes over, through a TLB miss fault handler, and provides the requested translation (step 208). Next, the process proceeds to determine if adjacent PTE entries can be coalesced along with the requested translation and updates the TLB, accordingly, which will be discussed in more detail below (steps 214-216).

If the requested VPN is not found in the VHPT 116 (step 210—not found), a VHPT walker TLB miss is raised (step 212). The operating system steps in, through a fault handler, and processes the fault (step 212). In addition, the process proceeds to determine if adjacent PTE entries can be coalesced and updates the TLB, accordingly, which will be discussed in more detail below (steps 214-216).

The VHPT 116, in the Itanium architecture can support two formats: a short format (shown in FIG. 5) or a long format (not shown). Only one format is used at a time and there is no mixing of formats within the VHPT 116. In the short format, the VHPT 116 is configured as a per-region virtual linear page table structure or as a single large hash page table in the long format. The technology of this disclosure is not restrained to either format and the teachings noted herein can be applied to either format.

Figure 5:
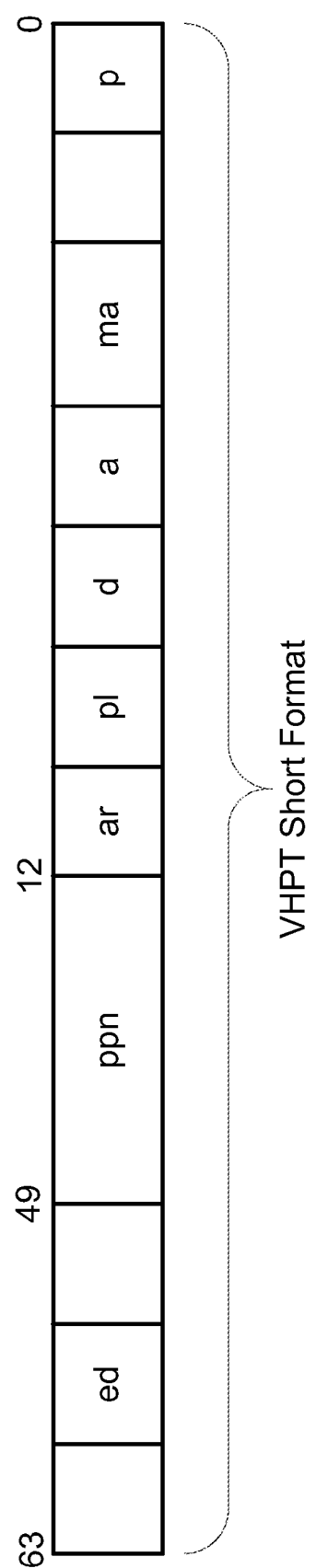
FIG. 5 is an exemplary embodiment of a VHPT short format entry.

Referring to FIG. 5, there is shown the data format for the short-format VHPT which includes the following fields: (1) ED: exception deferral—when asserted, a fault on the speculative load is forced to indicate a deferred exception; (2) PPN: physical page number (described above); (3) AR: access rights (described above); (4) PL: privilege level—specifies a privilege level or promotion level of the page and controls using four levels of privilege; (5) D: dirty bit—when deasserted causes any store or semaphores reference to the page to cause a dirty bit fault; (6) A: accessed bit—when deasserted, triggers an instruction or data access bit fault on reference; (7) MA: memory attribute—describes the cache ability, coherence, write policy and speculative attributes of the mapped physical page; (8) P: present bit—when de-asserted, references using this translation are caused to issue an instruction or data page not present fault.

Referring to FIGS. 4 and 6, once the VHPT 116 has found the requested PTE (step 210—found), a determination is made whether any other pages can be coalesced with this translation (step 214). The process looks for additional contiguous PTEs that can be coalesced with the PTEs represented by the requested virtual address. However, the coalesced page needs to have identical page attributes (see FIG. 5), be physically aligned and contiguous to the requested physical page, and virtually aligned with the requested virtual address.

The first step is to look for a possible candidate for coalescing. Such a page would have to be virtually adjacent and aligned to the requested virtual page (step 300). The low order bit of the physical page number of the requested virtual address indicates the direction in which to search for such a page in the VHPT. The term direction means whether the virtual page has a lower virtual address or a higher virtual address than the requested virtual address. For example, assume that the requested virtual address is $VA_R$ which corresponds to $PPN_R$. If the low order bit in $PPN_R$ were '0', then the possible candidate would have a higher virtual address, $VA_C=VA_R+$page size, whereas if the low order bit in $PPN_R$ were '1', then the possible candidate would have a lower virtual address, $VA_C=VA_R-$page size. Once the candidate virtual address has been formed, it is used to search the VHPT for the associated PTE (step 302).

Next, the process determines if the candidate virtual page is physically contiguous to the requested physical page, $PPN_R$ (step 304). In continuing the above example, this can be determined by checking if the corresponding physical page number, $PPN_C$. If $PPN_C=PPN_R+1$, in the case where $VA_C=VA_R+$page size, or if $PPN_C=PPN_R-1$, in the case where $VA_C=VA_R-$page size, then the candidate virtual page is contiguous or adjacent to the requested physical page, $PPN_R$ (step 304).

If the candidate PTE is not physically contiguous to the requested physical page (step 304—no), the PTEs are not coalesced. Instead the requested translation is written into the TLB (step 216) and the memory accessed (step 218).

If the candidate PTE is physically contiguous with the requested translation (step 304—yes), the process determines if the lower of the requested and candidate PTE's virtual addresses are physically aligned on a page boundary larger than either PTE's page size (step 308). If not (step 308—no), the candidate PTE is not considered for coalescing and the requested translation is written into the TLB (step 216) and the memory accessed (step 218).

If the candidate PTE is physically aligned (step 308—yes), the process determines if the attributes in the PTE entries are compatible (step 312). The coalesced PTE entries would have to have compatible data values or attributes in certain fields as the requested PTE (step 312). In one embodiment, for example, as shown in FIG. 5, the coalesced entries would have identical values for the ED, AR, PL, D, A MA, and P fields (step 312). This is to ensure that protections and access controls are left in tact when the entries are coalesced. If the PTEs do not have compatible attributes (step 312—no), then the PTEs are not coalesced and requested translation is written into the TLB (step 216) and the memory accessed (step 218).

Referring back to FIG. 2, once a coalesced PTE entry is found, the coalesced entry is written back into the TLB (step 216). The new TLB entry would have its page size (PS) set to the accumulative page size of the coalesced entries, the VPN field would be set to the lowest VPN value of the coalesced PTE entries, and the PPN field will be set to the lowest PPN value of the coalesced VHPT entries (step 216).

Next, the physical address is formed as noted above with respect to FIG. 2 and the requested physical memory address is accessed (step 218).

The embodiments were described with respect to the short format VHPT. However, the foregoing description can be modified for application for use with a long format VHPT. The VHPT walker or operating system fault handlers would use well-known mapping techniques to determine the location of a candidate "adjacent" physical page and if aligned and compatible, then these pages would be coalesced into a single TLB entry.

In addition, the coalescing steps shown in FIG. 6 have been described to coalescing pairs of adjacent PTEs. However, the technology described herein is not limited to coalescing pairs, and in other embodiments, the process can be repeated to coalesce additional entries provided they meet the criteria described above.

The foregoing description, for the purposes of explanation, has been described with reference to specific embodiments. However, the illustrative discussions are not intended to be exhaustive or to limit the invention to the precise forms disclosed. Many modifications and variations are possible in view of the enclosed teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method comprising:
   in response to a processor request for accessing a virtual memory address, finding in a virtual page table, a first page-translation entry (PTE) matching the virtual address, and having a first physical page number;
   in response to finding said first PTE, finding in the virtual page table a second PTE representing a contiguous physical page to a physical page represented by the first PTE and having a second physical page number;
   coalescing the first and second page PTEs into a single translation-lookaside buffer (TLB) entry; and
   in further response to said processor request, accessing physical memory corresponding to said virtual memory address after said coalescing.

2. A method as recited in claim 1 further comprising, prior to the coalescing step, determining that the attributes of the first PTE and the second PTE are compatible.

3. A method as recited in claim 1 further comprising writing the single TLB entry into the TLB with a page size equal to the sum of the first and second PTE page sizes.

4. A method as recited in claim 1 further comprising writing the single TLB entry into the TLB with a TLB physical page number set to a value that is the lowest of the first physical page number and the second physical page number.

5. An apparatus for translating a virtual address, comprising:
   a translation lookaside buffer;
   a virtual page table coupled to the translation lookaside buffer, configured to receive the virtual address and configured to have a plurality of page table entries, each page table entry representing a physical page associated with a virtual address; and
   an on-the-fly coalescing mechanism, coupled to the virtual page table, configured to, prior to accessing a physical address corresponding to said virtual address,
      search the virtual page table for the virtual address when the virtual address is not in the translation lookaside buffer, and
      coalesce a page table entry corresponding the physical page corresponding to the virtual address with a page table entry for a page contiguous with the physical page corresponding to the virtual address into a single page table entry for storage in the translation lookaside buffer.

6. An apparatus as recited in claim 5 wherein the coalescing mechanism is a hardware walker.

7. An apparatus as recited in claim 5 wherein the coalescing mechanism is a software program.

8. A method comprising:
   in response to a processor request for an access of a virtual memory address, coalescing in a translation lookaside buffer, page table entries including a page table entry corresponding to said virtual memory address; and
   then and in further response to said processor request, forming and accessing a physical address corresponding to said virtual memory address.

* * * * *